United States Patent [19]
Matsuzawa et al.

[11] Patent Number: 4,931,820
[45] Date of Patent: Jun. 5, 1990

[54] AUTO-FOCUS CAMERA

[75] Inventors: Yoshinori Matsuzawa, Hachioji; Shinya Takahashi, Kodaira, both of Japan

[73] Assignee: Olympus Optical Company Ltd., Japan

[21] Appl. No.: 236,634

[22] Filed: Aug. 25, 1988

[30] Foreign Application Priority Data

Aug. 25, 1987 [JP] Japan ................................ 62-212363
Aug. 31, 1987 [JP] Japan ................................ 62-217733
Aug. 31, 1987 [JP] Japan ................................ 62-217734

[51] Int. Cl.⁵ .............................................. G03B 3/10
[52] U.S. Cl. .................................................. 354/402
[58] Field of Search ....................... 354/400, 402–409; 250/201, 201 AF, 201 PF, 204

[56] References Cited

FOREIGN PATENT DOCUMENTS 62-18519 4/1987 Japan .

Primary Examiner—W. B. Perkey
Attorney, Agent, or Firm—Louis Weinstein

[57] ABSTRACT

An auto-focus camera detects a focal offset, which is converted into a lens drive value utilizing data stored in lens ROM or the like which is specific to a particular taking lens. When the specific data represents a lens drive value which is stored in a table form in a manner corresponding to the focal offset, a lens drive value corresponding to the detected focal offset is selected, and is used to drive the focus lens. When the specific data is not dependent on the focal offset, a lens drive value is calculated utilizing the focal offset and the specific data, and is used to drive the focus lens.

29 Claims, 16 Drawing Sheets

AUTO-FOCUS CAMERA

BACKGROUND OF THE INVENTION

The invention relates to an auto-focus camera, and more particularly, to such camera in which an offset from as predetermined focussed position where an object being photographed is to be imaged is detected and used to drive a taking lens to an in-focus position.

As is well recognized, a focus control employed in auto-focus cameras includes two techniques, one feeding the entire taking lens and the other feeding only part of the taking lens. FIG. 15 illustrates an optical path diagrammatically which is followed when feeding the entire taking lens. In this Figure, an imaging plane for an object D will be in focus or coincides with a film surface (f) when a taking lens is located at (d), and another object E will be in focus when the taking lens is located at (e). Denoting the focal length of the taking lens by f, a spacing between the principal points by $\Delta$, a spacing between the object D and the lens position (d) by $(f+x_D)$, a spacing between the position (d) and the film surface (f) by $(f+x'_D)$, a spacing between the object E and the lens position (e) by $(f+x_E)$, and a spacing between the lens position (e) and the film surface (f) by $(f+x'_E)$, it follows that $$x_E x'_E = f^2$$

or $$x'_E = f^2/x_E \quad (1)$$

When the taking lens moves from the position (e) to the position (d), the object E can no longer be imaged upon the film surface (f), but will be imaged on a plane (c) which is spaced from the film surface (f) by a distance $t_{DE}$. Representing a spacing between the object E and the lens position (d) by $(f+x_{DE})$ and a spacing between the lens position (e) and the imaging plane (c) by $(f+x'_{DE})$, it will be seen from the illustration that $$f+x'_{DE} = f+x'_D + t_{DE}$$

or $$x'_{DE} = x'_D + t_{DE} \quad (2)$$

Since $$x_{DE} x'_{DE} = f^2$$

we have $$x_{DE} = f^2/x'_{DE} \quad (3)$$

In order to bring the imaging plane for the object E into coincidence with the film surface (f) or to achieve an in-focus condition, it will be seen that the taking lens may be fed through a distance $(x'_E - x'_D)$.

It will be seen from the illustration that the distance form the object E to the film surface (f) is given by the following equation:

$$f+x_{DE}+\Delta+f+x'_D = f+x_E+\Delta+f+x'_E$$

Accordingly $$x_{DE}+x'_D = x_E+x'_E \quad (4)$$

The substitution of the equation (3) into the equation (4) yields $$(f^2/x'_{DE})+x'_D = x_E+x'_E \quad (5)$$

The substitution of the equation (2) into the equation (5) yields $$f^2/(x'_D+t_{DE}) = x_E+x'_E-x'_D$$

Solving this equation for $t_{DE}$, we have $$t_{DE} = f^2/(x_E+x'_E-x'_D)-x'_D$$

Assuming that $x'_D$ and $x'_E$ are sufficiently small as compared to $x_E$, the above equation can be approximated as follows:

$$t_{DE} \approx (f^2/x_E)-x'_D \quad (6)$$

The substitution of the equation (1) into the equation (6) yields $$t_{DE} \approx x'_E - x'_D$$

This means that the offset $t_{DE}$ of the imaging plane for the object E is substantially equal to a difference between the amount of travel by which the taking lens is fed in reaching the positions (e) and (d). Accordingly, by assuming a conversion coefficient kl which remains invariant with a focussing lens position or an offset in the position of the focus, a quantity l by which the taking lens is to be driven can be expressed with respect to a focal offset $t_{DE}$ as follows:

$$l = kl \cdot t_{DE}$$

However, if $x'_D$ and $x'_E$ are not negligible in comparison to $x_E$, or when the travel by which the taking lens is fed increases or where the entire taking lens is not fed but only part of the lens (hereafter referred to as a focus group) is fed for purpose of focussing, there occurs a change in the focal length or spacing between the principal points, whereby the described approximation no longer applies. For this reason, the travel of the focus group is related to an offset of the imaging plane in a non-linear manner, causing the value of the conversion coefficient kl to change depending on the position of the focus group. To accommodate for this, the value of kl is chosen to be small in order to prevent a failure of achieving an in-focus condition as a result of a diversion thereof. Alternatively, for a lens which exhibits an increased magnitude of non-linearity, the position of the focus group is detected, and the kl value which applies only in the vicinity of such position is employed.

This increases an error in the travel by which the focussing lens is to be driven, and also makes it difficult to achieve a movement of the focussing lens into an intended position in one pass, requiring a repeated detection of a focussed position followed by sequentially driving the focussing lens. This resulted in an increased length of time required for the focussing operation, which prevented a rapid photographing operation, and also resulted in the difficulty to achieve a high accuracy of the focussing operation.

To cope with this problem, an auto-focus arrangement is disclosed in Japanese Laid-Open patent application No. 78,519/1987 in which means is provided for calculating a travel by which a focussing lens group is to be fed, by determining a reference coefficient which relates to a focus detecting output signal and a lens movement and deriving a movement coefficient therefrom which may be utilized to drive a focussing lens group. The present applicant has previously proposed an auto-focus camera in which a travel for a focussing lens group is derived by utilizing a conversion coefficient which depends on a lens travel and a focal offset (Japanese pending Patent Application No. 121,790/1987).

However, these proposals fail to derive a movement coefficient in the event a movement of the focussing lens group is non-linear, and if such coefficient is derived, the very use of the movement coefficient requires an increased length of time and labor in reaching a travel of the focussing lens which matches the focal offset in a one-to-one correspondence. Also, the calculation involves a systematic error of an increased magnitude because a number of multiplications and divisions are repeated, eventually resulting in an error in the travel of the focussing lens.

As an overall consequence, where the lens is significantly defocussed, the focus group cannot be driven to its in-focus position in one lens movement, but a plurality of measurements of the distance and associated lens drive have to be repeated to achieve an in-focus condition, thus requiring an increased length of time.

In addition, an offset of the imaging plane from the film surface does not match the amount of defocus, as will be discussed below. FIG. 16 diagrammatically illustrates an optical path of an auto-focus (hereafter abbreviated as "AF") arrangement. In this Figure, an AF focus detecting sensor 40 includes a number of elements which are disposed to view a pupil position of a taking lens 43 through a fry eye lens 41 and a contact lens 42. As a result of using the contact lens 42, an error or offset of the imaging plane for the light from an object being photographed is inevitable. As illustrated in FIG. 17A, if it is forwardly focussed, a true defocus Er1 does not match a defocus Ers1 detected by the sensor 40. Where it is focussed rearwardly as shown in FIG. 17B, a true defocus Er2 again does not match a defocus Ers2 detected by the sensor 40. FIG. 18 graphically shows a hyperbolic relationship between the true defocus Er and the defocus Ers detected by the sensor 40. In this Figure, the relationship shown in phantom line will be reached when Er=Ers.

Representing the focal length of the taking lens 43 by fc and taking the direction in which the light travels as positive, there is the following relationship:

$$1/fc = -1/Er + 1/Ers$$

Solving this for Er yields $$Er = fc \cdot Ers/(fc - Ers) \qquad (7)$$

Thus, to obtain the true defocus Er, the defocus Ers detected by the sensor 40 and the focal length fc of the contact lens 42 must be substituted into the equation (7) for calculation.

In the prior art practice, a correction according to the equation (7) which is applied to a detected output from the offset sensor is applied within the sensor, and the corrected defocus is employed as an offset between the film surface and the imaging plane or as the focal offset, which has been made the basis for subsequent calculations.

The correction according to the equation (7) has been applied within the sensor of the focal detector in a conventional auto-focus camera, but depending on the technique employed for the calculation, the correction itself resulted in an increased error or the calculation took too long a time in order to improve the accuracy. Since the true defocus as corrected is subsequently converted into a signal relating to the lens drive value within the camera, it will be seen that there may be an unnecessarily iterated calculation process.

SUMMARY OF THE INVENTION

It is an object of the invention to provide an auto-focus camera which permits a drive value applied to a focus group to be directly calculated by utilizing a focal offset signal without previously performing any correction thereon.

It is another object of the invention to provide an auto-focus camera, which is capable of completing a distance measurement and a lens drive in substantially one step, by making a drive value or movement coefficient which depends on the prevailing lens position and associated focal offset to be available from memory means as data specific to a particular taking lens.

It is a further object of the invention to provide an auto-focus camera capable of deriving a lens drive value utilizing the focal offset as well as data specific to a particular taking lens which does not depend on the focal offset.

In accordance with the invention, the need for converting a focal offset which is detected by the focus detector into a true focus is eliminated while allowing a drive value for focus group to be derived with a good accuracy. This dispenses with a calculator which has been used in the prior art to provide a correction within the focus detector. In this manner, the calculation only takes place within a main CPU, with consequence that the calculation can be achieved in a rapid manner and with a high accuracy.

Where part of a lens is moved for purpose of focussing, the invention enables an appropriate travel for the focus group to be calculated, thus allowing the length of time which is required to complete an AF operation to be drastically reduced, without requiring repeatedly performing the AF operation.

DETAILED DESCRIPTION OF PREFERRED EMBODIMENTS

Figure 1:
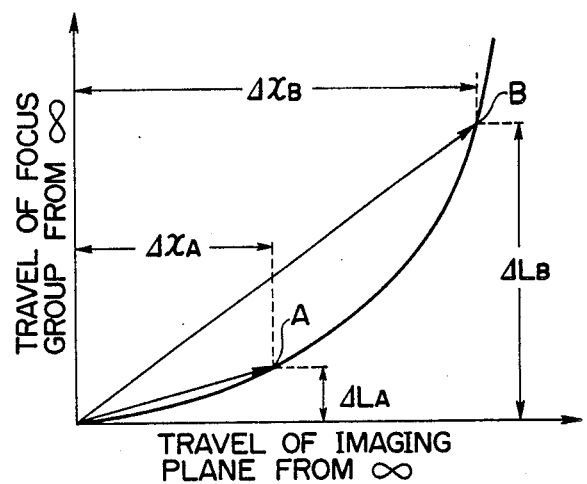
FIGS. 1 and 2 diagrammatically illustrate the travel of a focus group with respect to a movement of the imaging plane, illustrating the principle of the invention.

Before describing embodiments of the invention, the principle of the invention will be explained with reference to FIGS. 1 and 2. Referring to FIG. 1, a focussing operation upon objects A and B which are located at different finite distances will be considered when a focus group is located at infinity (hereafter denoted by ∞). Points A and B shown in FIG. 1 indicate the position of a focus group assumed when it is focussed upon either object A or B. By the measurement of a distance, an offset $\Delta x_A$ and an offset $\Delta x_B$ can be detected. In order to achieve a desired focussing operation in a single lens drive operation, it is sufficient that a travel $\Delta L_A$, $\Delta L_B$ of the focus group may be determined uniquely with respect to each offset $\Delta x_A$, $\Delta x_B$.

Figure 2:
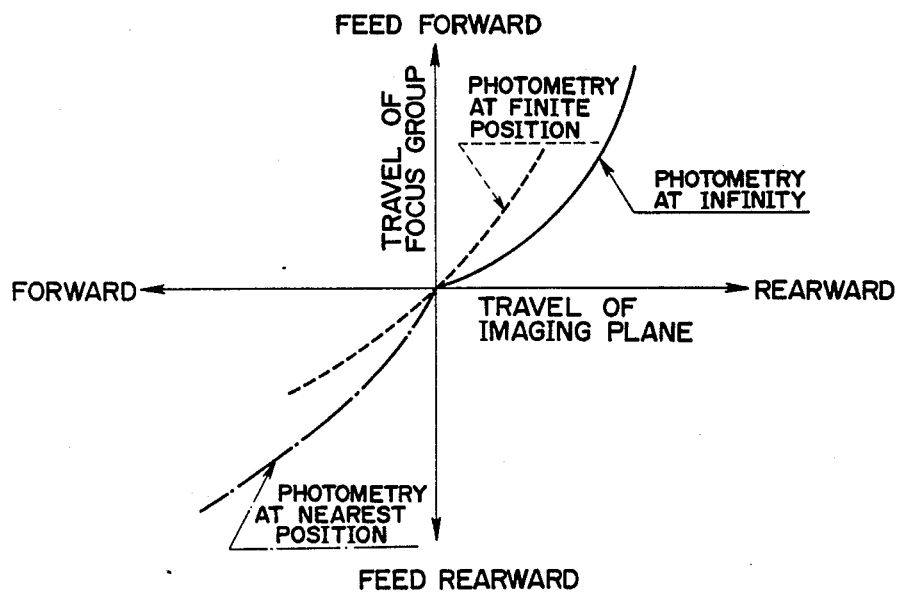

FIG. 2 illustrates a variation in the relationship between the movement of the imaging plane and the travel of the focus group which depends on the position of the focus group as the distance is being measured. In FIG. 1, it is assumed that the lens position is at ∞ when the distance is being measured, but as the position of the focus group changes when the distance is being measured, the relationship between the movement of the imaging plane and the travel of the focus group varies in the manner indicated in FIG. 2. Specifically, when the focus group is located at ∞ position, the relationship between the travel of the focus group and the movement of the imaging plane will be indicated by a solid line curve shown in FIG. 2 while such relation will be indicated by a phantom line curve when the focus group is located at its nearest position and will be indicated by a broken line curve when it is located at a finite position, thus, undergoing a change in a manner dependent on the position of the focus group as the distance is being measured. Thus it will be seen that obtaining a travel which corresponds to the offset is insufficient to achieve the focussing operation in one AF cycle, but it is necessary that an optimum lens drive value must be determined as a function of a defocus depending on the prevailing relationship between the movement of the imaging plane and the travel of the focus group, by determining the position of the focus group as the distance is being measured.

However, it should be recognized that the relationship between the offset and the lens drive values varies in a limited range for normal photographic operations, and any resulting error will present a problem only in a macro range, for example. By contrast, where the focus group is driven by using a non-linear cam or the like, there occurs a greater variation in the described relationship. The relationship between the focal offset and the drive value changes with a zooming position where a zooming lens is used.

In accordance with the invention, a drive $\Delta L$ as a function of a given offset $\Delta x$ is obtained by the use of conversion means such as a matrix which contains values of the drive $\Delta L$ with respect to values of the offset $\Delta x$, thus completing the AF cycle in a minimum number of passes without calculating a movement coefficient.

When the drive values $\Delta L$ corresponding to all the values of the offset $\Delta x$ are to be stored, there may arise a problem of insufficient memory capacity. In such instance, the values of the offset $\Delta x$ are segmented into a plurality of regions, to each of which a given value of drive $\Delta L$ is established. By utilizing an interpolation for any detected value of offset $\Delta x$, a compression in the memory capacity is enabled.

Where the relationship between the focal offset and the drive value changes as a function of the position of the focussing lens to a degree, for which resulting error cannot be neglected, a series of drive values corresponding to a series of focal offset values may be utilized in a manner dependent on the position of the focussing lens, thus allowing an accurate drive value to be determined. Again, a desired drive value may be obtained through interpolation depending on the position of the focussing lens. Where a zooming lens is employed, an accurate drive value may be obtained by previously establishing a series of drive values $\Delta L$ corresponding to a series of values of the offset $\Delta x$ in a manner dependent on the zooming condition. Again, an interpolation may be utilized to derive a drive value $\Delta L$ depending on the zooming operation.

Figure 3:
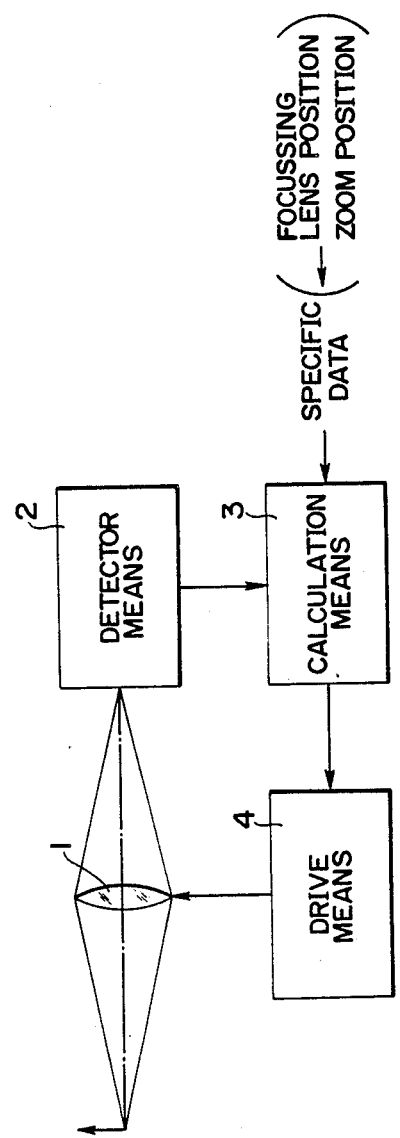
FIG. 3 is a schematic view illustrating the basic concept of the invention as applied in one embodiment of auto-focus camera.

FIG. 3 illustrates the basic concept of the invention. In the arrangement of FIG. 3, a focal offset which occurs upon imaging by a taking lens 1 is detected by detecting means 2. As mentioned previously, the focal offset detected represents a defocus Ers detected by a sensor contained within the detecting means 2, and is not yet corrected to a true defocus Er. The focal offset is input to calculator means 3, which includes storage means containing data specific to a particular taking lens 1. The calculator means 3 also includes converter means which converts the focal offset into a lens drive value. Drive means 4 responds to a lens drive value fed from the calculator means 3 to control the driving of a focus group contained within the taking lens 1.

The specific data mentioned above may be in two kinds, first, a value of the specific data itself may depend on the magnitude of the focal offset. Second, the value of the specific data may be independent from the magnitude of the focal offset. An example of the specific data of the first kind is a movement coefficient or drive value which has a one-to-one correspondence to the focal offset (detected). If required, the accuracy of such data may be improved by utilizing an interpolation. By way of example, an improvement in the accuracy may be achieved by incorporating the position of a focus lens group or the position of the zooming lens system into a series of movement coefficients or a series of drive values.

Specific data of the second kind may be expressed as follows, utilizing constants a, b and c or a', b' and c' which are specific to a particular lens.

$$k = a/(b + Ers) + c$$

$$\Delta L = a'/(b' + E_{rs}) + c' E_{rs} - a'/b'$$

A movement coefficient k or the drive value $\Delta L$ may be calculated utilizing a hyperbolic approximation equation. Ers represents a defocus detected by a sensor. The accuracy can be improved by modifying or reading selected values of the constants a to c or a' to c' depending on the position of the focus group or the zooming lens system. A lens drive is inherently related to a defocus by a hyperbolic relationship; thus $$k = a/(b + Er) + c \qquad (8)$$

is a good approximation. By substituting the true defocus represented by the equation (7) into the equation (8), it may be converted into a defocus detected by a sensor.

$$k = \frac{a}{b + \frac{fc \cdot Ers}{fc - Ers}} + c$$

$$= a \cdot \frac{fc - Ers}{fc\, Ers + b(fc - Ers)} + c$$

$$= \frac{-a}{(fc - b)} \cdot \frac{\frac{b\,fc}{fc - b} + Ers - \frac{b\,fc}{fc - b} - fc}{\frac{b\,fc}{fc - b} + Ers} + c$$

$$= \frac{a}{fc - b} \cdot \frac{\frac{b\,fc}{fc - b} - fc}{\frac{b\,fc}{fc - b} + Ers} - 1 + c$$

$$= \frac{a}{fc - b} \cdot \frac{\frac{b\,fc}{fc - b} - fc}{\frac{b\,fc}{fc - b} + Ers} + c - \frac{a}{fc - b}$$

Because the constants a, b, c, fc are constants which are independent from the defocus Ers detected by the sensor, a unit conversion may be performed as follows:

$$a \leftarrow \frac{a}{fc - b} \left( \frac{b\,fc}{fc - b} - fc \right)$$

$$b \leftarrow \frac{b\,fc}{fc - b}$$

$$c \leftarrow \left( c - \frac{a}{fc - b} \right)$$

Thus, the described equation can be rewritten into the following form:

$$k = a/(b + Ers) + C \qquad (9)$$

It will be seen from a comparison of the equations (8) and (9) that a similar equation can be utilized for the calculation when employing a non-corrected Ers, with the consequence that a correction to the true defocus can be dispensed with, allowing the defocus Ers detected by the sensor to be used in achieving the AF lens drive.

Figure 4:
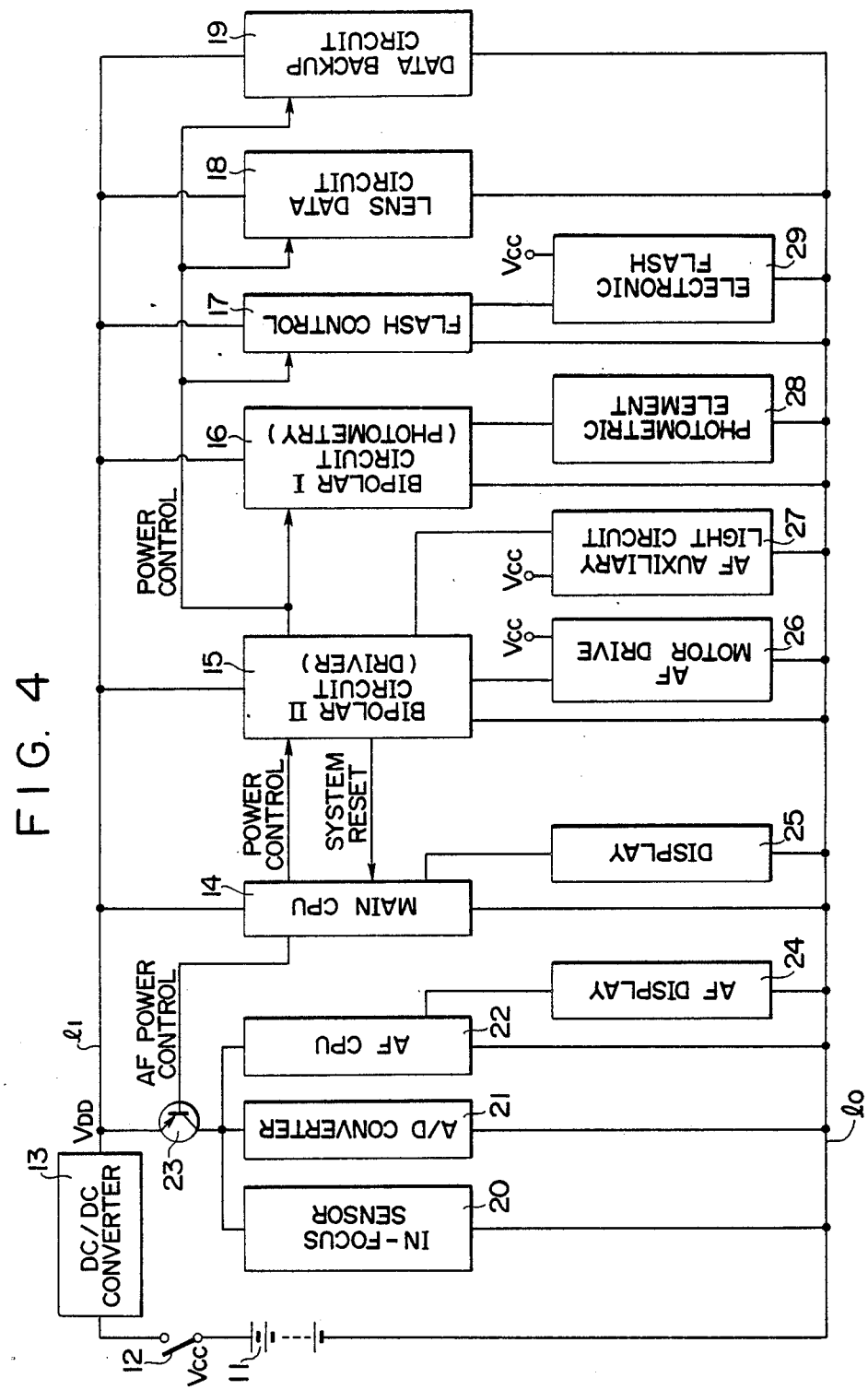
FIG. 4 is a block diagram of a power control circuit including an auto-focus assembly of a camera to which the invention is applied as its essential part.

An auto-focus camera of interchangeable lens type according to a specific embodiment of the invention will now be described. FIG. 4 is an overall block diagram of a camera system which principally illustrates the power supply. A battery 11 acting as a power supply feeds a voltage Vcc to a DC/DC converter 13 when a power switch 12 is closed. The converter 13 boosts the voltage to provide a stabilized voltage $V_{DD}$ across a pair of buses $l_0$, $l_1$. A variety of circuits including a main CPU 14, a bipolar II circuit 15, a bipolar I circuit 16, an electronic flash control circuit 17, a lens data circuit 18 and a data backup circuit 19 are connected across these buses. The power supply to the bipolar II circuit 15 is controlled by a signal delivered from a power control circuit contained within CPU 14. The power supply to components beginning with the bipolar I circuit 16 and continuing to the data backup circuit 19 is controlled by a power control signal delivered from the bipolar II circuit 15.

An AF block comprising an in-focus sensor 20, an A/D converter 21 and AF CPU 22 is connected across the buses $l_0$, $l_1$ through a power controlling transistor 23, which is controlled in an on/off manner by a signal delivered from an AF power control circuit contained within CPU 14. The purpose of AF CPU 22 is to perform calculations according to an AF algorithm and it is connected to an AF display 24 which indicates an in-focus or out-of-focus condition. On the other hand, the purpose of the main CPU 14 is to control a film winding, rewinding and an exposure sequence of the camera, and to this end, it is connected to a display 25 which performs all the display functions other than indicating an in-focus or out-of-focus condition. The bipolar II circuit 15 includes various drivers which are required to perform individual sequences of the camera including the control of a film winding and rewinding motor, a lens drive and a shutter control, and is connected to an AF motor drive circuit 26 and an AF auxiliary light circuit 27. The principal function of the bipolar I circuit 16 is to effect photometry and includes a photometric element 28. The purpose of the electronic flash control circuit 17 is to control the emission of light from an electronic flash 29 which is either internally housed or externally connected. The lens data circuit 18 functions to store lens data which are specific to each interchangeable lens and which is required to perform an AF, photometry and other camera control function. Of lens data stored in the lens data circuit 18, data which is required in an AF operation includes a lens magnification factor (zoom factor), a macro identification signal, absolute distance coefficients a, b, a power focus duty cycle, an AF accuracy threshold ETh, a direction of lens movement, an open F-value, a maximum shift $S_{MAX}$ (representing a maximum value of a phase difference), and a maximum pulse which represents a maximum value of a lens drive value.

The bipolar II circuit 15 monitors the supply voltage $V_{DD}$, and delivers a system reset signal to the main CPU 14 to interrupt the power supply to components from the bipolar II circuit 15 to data backup circuit 19 and also to interrupt the power supply to the in-focus sensor 20, A/D converter 21 and AF CPU 22, all of which constitute together the AF block, when the supply voltage reduces below a given level. The power supply to the main CPU 14 is continued even if the supply voltage reduces below the given value.

Figure 5:
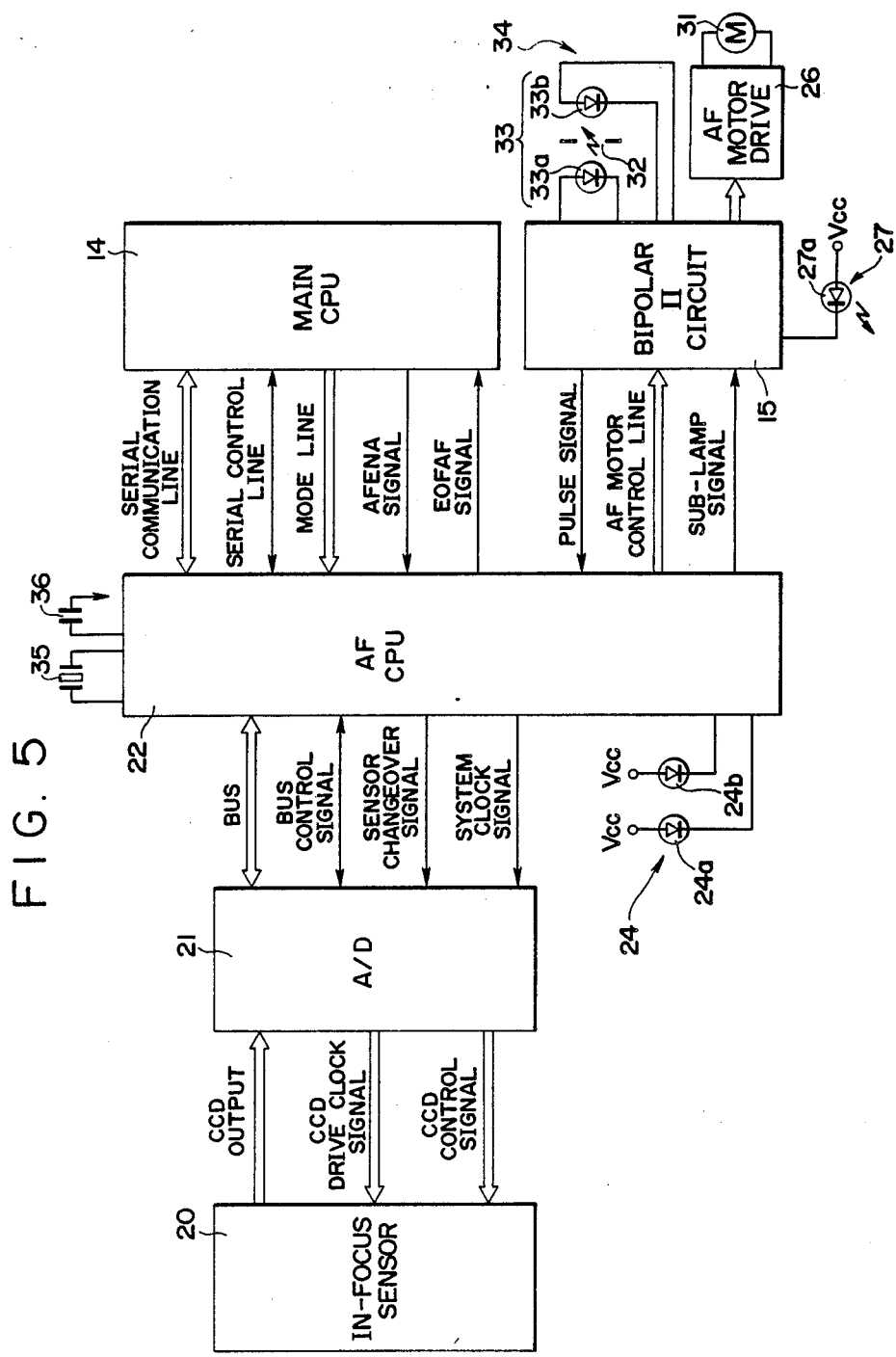
FIG. 5 is a block diagram illustrating a signal transfer within the auto-focus circuit shown in FIG. 4.

FIG. 5 is a diagrammatic illustration of a transfer of signals to and from the AF block. A serial communication line is provided between the AF CPU 22 and the main CPU 14 to effect a data transfer, and the direction of communication is controlled by a serial control line. Data which is subject to such communication includes specific lens data which is stored within the lens data circuit 18 and the absolute distance information. The main CPU 14 communicates to the AF CPU 22 information representing a particular mode of the camera (AF single mode/AF sequence mode/power focus (hereafter abbreviated as PF) mode/other modes) as decoded. In addition, the main CPU 14 delivers AFENA (AF enable) signal to the AF CPU 22 which controls the start/stop of the AF or PF mode. The AF CPU 22 delivers an EOFAF (end-of-AF) signal to the main CPU 14, which is delivered at the completion of an operation in the AF or PF mode, enabling a transition to an exposure sequence.

The bipolar II circuit 15 decodes a signal on an AF motor control line which is delivered from the AF CPU 22 for driving the AF motor drive circuit 26. When an output from the drive circuit 26 causes a rotation of an AF motor (lens drive motor) 31, slits 32 which are formed in a rotatable member of a lens barrel at an equal interval rotate, whereby a photo-interrupter 33 comprising a combination of oppositely disposed light emitter 33a and light receiver 33b counts the number of slits 32 which have passed therethrough. In this manner, the combination of slits 32 and the photo-interrupter 33 constitutes a pulse emitter 34, a pulse signal (a count signal) from which is subject to a waveform shaping before it is introduced into the AF CPU 22.

The AF CPU 22 delivers a sub-lamp (hereafter abbreviated as S-lamp) signal to the bipolar II circuit 15 for controlling the AF auxiliary light circuit 27, allowing the S-lamp 27a to be illuminated when an object being photographed is under a low light (brightness) condition and of a low contrast.

The AF display 24 connected to the AF CPU 22 includes a light emitting diode (LED) 24a which is illuminated when the camera is in focus, and another LED 24b which is illuminated when an in-focus condition cannot be reached. It will be noted that the AF CPU 22 is connected with a clock oscillator 35 and a reset capacitor 36.

A data transfer takes place through a bus between the AF CPU 22 and the A/D converter 21, with the direction of transfer being controlled by a bus control signal. The AF CPU 22 delivers a sensor changeover signal and a system clock signal to the A/D converter 21. The A/D converter 21 delivers a CCD drive clock signal and a CCD control signal to the in-focus sensor 20 which may comprise CCD elements, for example, causing a CCD output to be read from the sensor 20. The CCD output in analog form which is read from the sensor is subject to conversion into a digital value before it is fed to the AF CPU 22.

Figure 6:
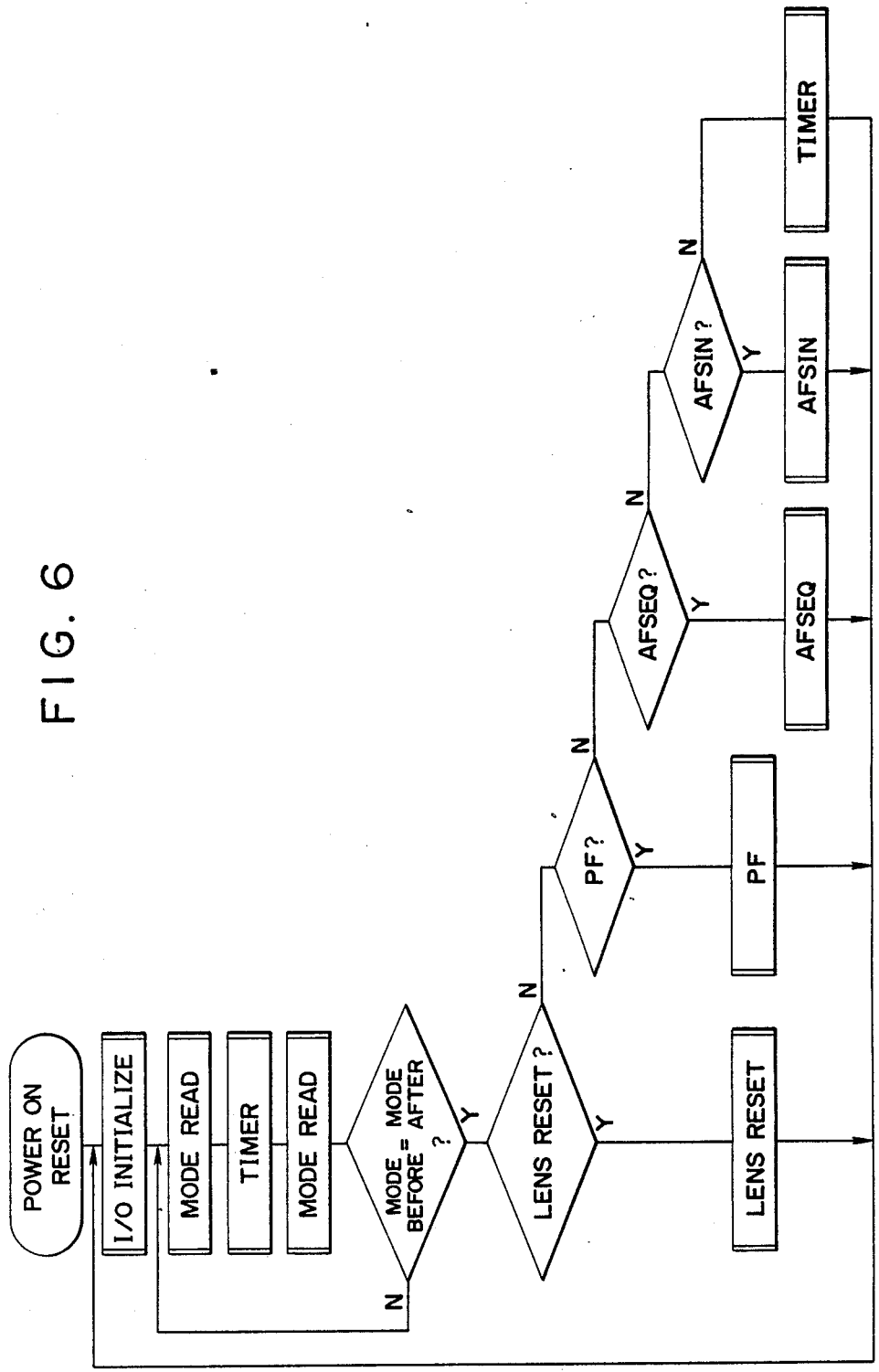
FIGS. 6 to 10 flow charts illustrating a programmed operation of AF CPU shown in FIG. 5.

A programmed operation of the microcomputer which principally relates to the AF block shown in FIG. 5 incorporating the invention will now be described with reference to flow charts. As shown in FIG. 4, when the AF power control circuit of the main CPU 14 is enabled, the transistor 23 is turned on to supply the supply voltage $V_{DD}$, whereby POWER ON RESET routine shown in FIG. 6 begins to be executed. When this routine starts, a drive circuit in the AF block is initialized in a "I/O initialize" subroutine. Specifically, the AF display 24, the AF motor drive circuit 26 and the AF auxiliary light circuit 27 are turned off and a serial communication bus leading to the main CPU 14 is initialized.

In a "mode read" subroutine which follows, a mode signal from the main CPU 14 is read, determining what lens drive mode is to be executed. A given time interval, defined by a "timer" routine, then passes, and the "mode read" routine is again entered to read the point in time when the mode is changed. By the time a mode switching is completed, the program returns to the initial "mode read" routine. The "mode read" subroutine is passed twice with the "timer" subroutine interposed therebetween in order to prevent an erroneous read operation at the time when the mode is being switched.

When a switching of the mode has taken place in a positive manner and the mode before the switching is equal to the mode after the switching, the mode which prevails after the switching is read, thereafter transitioning to subroutines of individual modes. Specifically, lens drive modes include "lens reset", "PF (power focus)", "AFSIN (AF single)" and "AFSEQ (AF sequence)". When one of these modes is selected, the subroutine of the selected mode is executed. Thereupon the program returns to the "I/O initialize" routine. When none of the "lens reset", "PF", "AFSIN" and "AFSEQ" mode is selected, and "other" mode is selected, this is recognized as noise, and the program returns to the "I/O initialize" routine after a given time has passed, as defined by the "timer" routine.

An operation which takes place in a "lens reset" mode represents an initialization or a clearing of an absolute distance counter by forcedly feeding the lens to a position corresponding to ∞ in order to convert a relative distance signal, or a distance measuring output signal which is output from the in-focus sensor 20, to a number of pulse counts from the ∞ position, thus converting into an absolute distance signal. When "lens reset" mode is selected, the program returns to the "I/O initialize" routine at a time interval of 5 ms, for example, after clearing the absolute distance counter. The purpose of the "PF" mode is to enable a lens focussing operation by utilizing a manual focussing or a focus aid by driving a distance ring associated with the lens by means of the lens drive motor 31 rather than by a manual operation. More particularly, the lens is fed forward and rearward by turning, PFUP (up) switch $SW_1$ and PFDN (down) switch $SW_2$ (to be more fully described) on and off. The operation in the "AFSIN" mode represents a one shot AF operation in which a focus is locked subsequent to AF operation with respect to an object being photographed. "AFSEQ" mode represents a continuous AF operation in which the AF operation takes place continuously as long as a release button remains at its first step.

Operating switches relating to various lens drive modes are listed in the Table 1 below, specifically utilizing four switches $SW_1$ to $SW_4$.

TABLE 1

| | Switch | | | | |
|---|---|---|---|---|---|
| | $SW_1$ (up) | $SW_2$ (down) | $SW_3$ (PF) | $SW_4$ (speed) | Mode |
| AF mode | OFF | OFF | OFF | * | lens reset |
| | OFF | ON | OFF | * | AFSIN |
| | ON | ON | OFF | * | AFSEQ |
| | ON | OFF | OFF | * | (OFF) |
| PF mode | ON | ON | ON | * | STOP |
| | ON | OFF | ON | OFF | PFUP; LO |
| | | | | ON | PFUP; HI |
| | OFF | ON | ON | OFF | PFDN; LO |
| | | | | ON | PFDN; HI |
| | OFF | OFF | ON | * | STOP |

* Either ON or OFF may be employed.)

First and second switches $SW_1$ and $SW_2$ shown in the Table 1 are used in common during the AF and the PF mode. When the third switch $SW_3$ is off, the AF mode is selected while the PF mode is selected when it is on. During the AF mode, when both the first and the second switch $SW_1$ and $SW_2$ are off, the lens reset mode is selected. Alternatively, when these switches are both on, AFSEQ mode is selected. When the first switch $SW_1$ is off while the second switch $SW_2$ is on, AFSIN mode is selected. During PF mode, when the first and the second switch $SW_1$ and $SW_2$ are both off or both on, the stop mode is selected. When the first switch $SW_1$ is on, PFUP (up) mode is selected in which the distance ring is rotated by a motor toward a nearest point to feed the lens forward. When the second switch $SW_2$ is on, PFDN (down) mode is selected, in which the distance ring is rotated toward the far side to feed the lens rearward. The fourth switch $SW_4$ remains without effect if it is on or off during any AF mode and during the stop mode of the PF mode. However, if this switch is on during the PF mode, HI (high speed) mode is selected in which the lens drive motor 31 rotates at an increased speed to achieve a rough movement of the distance ring. When the switch is off, LO (low speed) mode is selected in which the motor 31 (see FIG. 5) rotates at a reduced speed, performing a fine movement of the distance ring.

Figure 7:
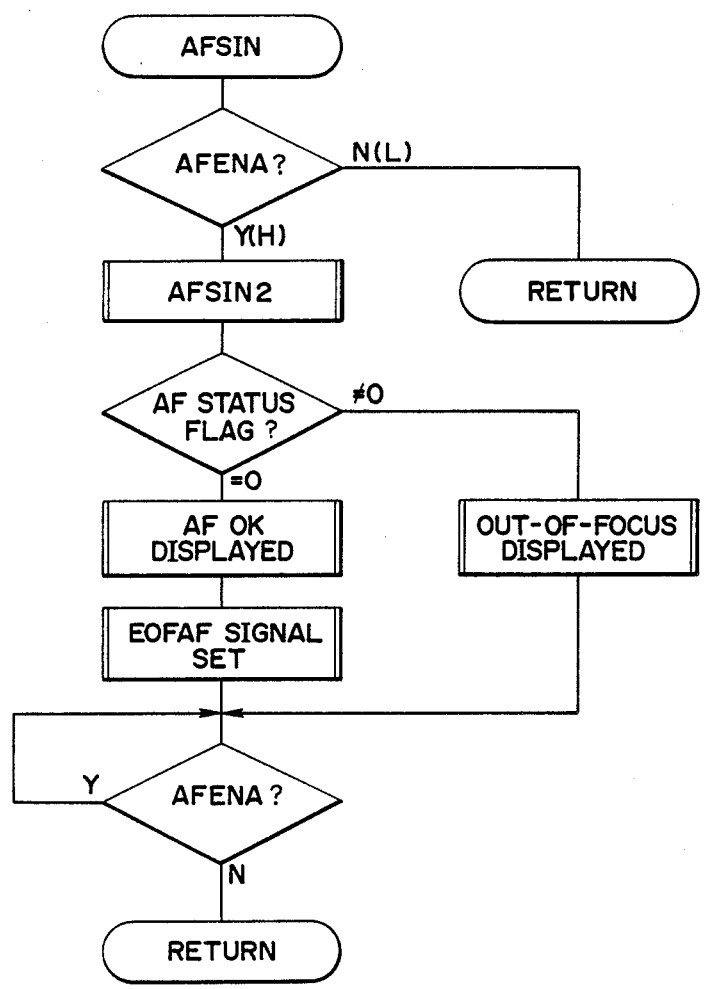

The operations which take place in the AF single mode will now be described with reference to flow charts shown in FIGS. 7 to 10. When "AFSIN" mode is selected, the "AFSIN" routine shown in FIG. 7 is executed in which the AFENA signal fed from the main CPU 14 is examined if it is at "H" level (active). The AFENA signal becomes active when the release button is operated to its first step to initiate the AF operation, whereby "AFSIN2" subroutine is called for. However, it is to be noted that the operation of the release button to its second step is accepted when the exposure sequence is initiated after the completion of the AF operation and the in-focus condition is reached. During the "AFSIN2" subroutine, a CCD integration by the in-focus sensor 20, the calculation of a photometric output and a lens drive take place. The in-focus or out-of-focus condition which represents the results of the operation of the "AFSIN2" subroutine is displayed subsequent to the completion of the operation of this subroutine while monitoring AF status flags. AF status flags include a low contrast flag (hereafter abbreviated as LC flag which is set to "1" when an object being photographed is of a low contrast), a move flag (hereafter abbreviated as M flag which is set to "1" when an object being photographed is in motion) and a nearest flag (hereafter abbreviated as N flag which is set to "1" when it is attempted to feed the lens beyond the nearest point). The in-focus condition can be reached when all of these flags are 0. The in-focus condition cannot be reached if one of these flags is set. Accordingly, by monitoring the AF status flags, LED 24a of the AF display 24 indicates an in-focus OK condition if the status flags are 0, but LED 24b indicates that the in-focus condition cannot be reached if the status flags are not all 0. Upon reaching an in-focus condition, the EOFAF signal is produced to complete the AF operation, and the main CPU 14 waits for the operation of the release button to its second step or the initiation of the exposure sequence. Thus, when the in-focus condition is reached, the subsequent lens operation is inhibited if the AFENA signal is active, and LED 24a which indicates an in-focus OK condition remains illuminated, establishing a focus locked condition. The program returns to the start of the POWER ON RESET routine shown in FIG. 6 when the AFENA signal from the main CPU 14 assumes its "L" level (inactive).

Figure 8:
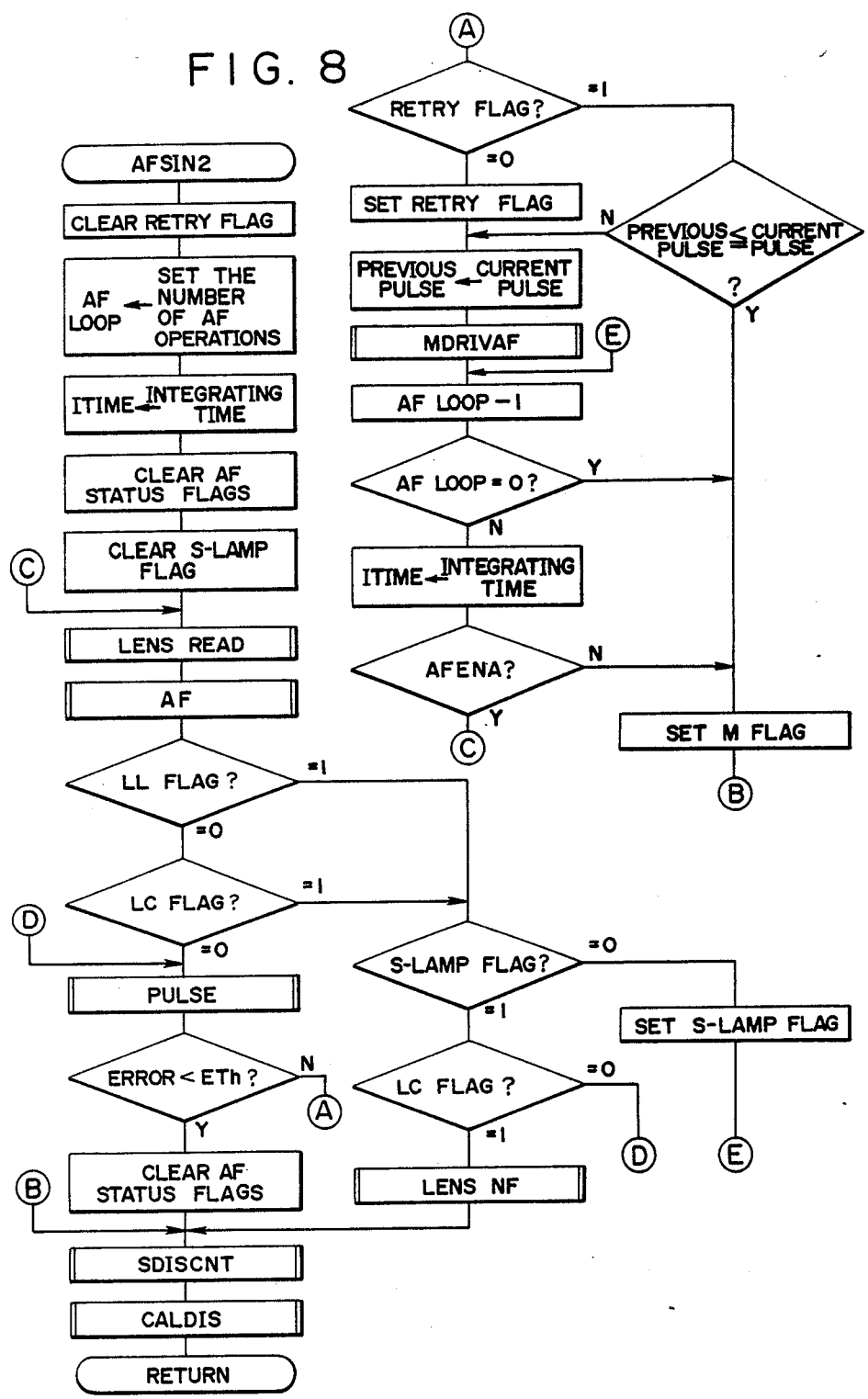

During the "AFSIN" mode, a programmed operation of the "AFSIN2" subroutine takes place in a manner illustrated in FIG. 8. Initially, RETRY flag is cleared in order to permit a comparison of a previous photometric value (a previous output pulse from the in-focus sensor 20) and a current photometric value (a current output pulse from the sensor 20), and a maximum number of distance measurements which may take place during a series of AF operations is preset in an AF loop counter. Subsequently, a maximum value of CCD integrating time is preset in ITIME register in order to assure a CCD integration at or above a given brightness level. The AF status flags are cleared as is the S-lamp flag. This completes the initialization before the initiation of the AF operation. The "lens read" routine is then called, reading lens data stored in the lens date circuit 18, and then the "AF" routine is called for purpose of distance measurement. During the "AF" subroutine, it is determined if it is required to illuminate the S-lamp 27a during the CCD integration. The S-lamp flag is set if such illumination is required, but is cleared when such illumination is unnecessary. A low light flag (hereafter abbreviated as LL flag) which is set to "1" when an object being photographed is under low light) and an LC flag is either set or cleared.

Figure 9:
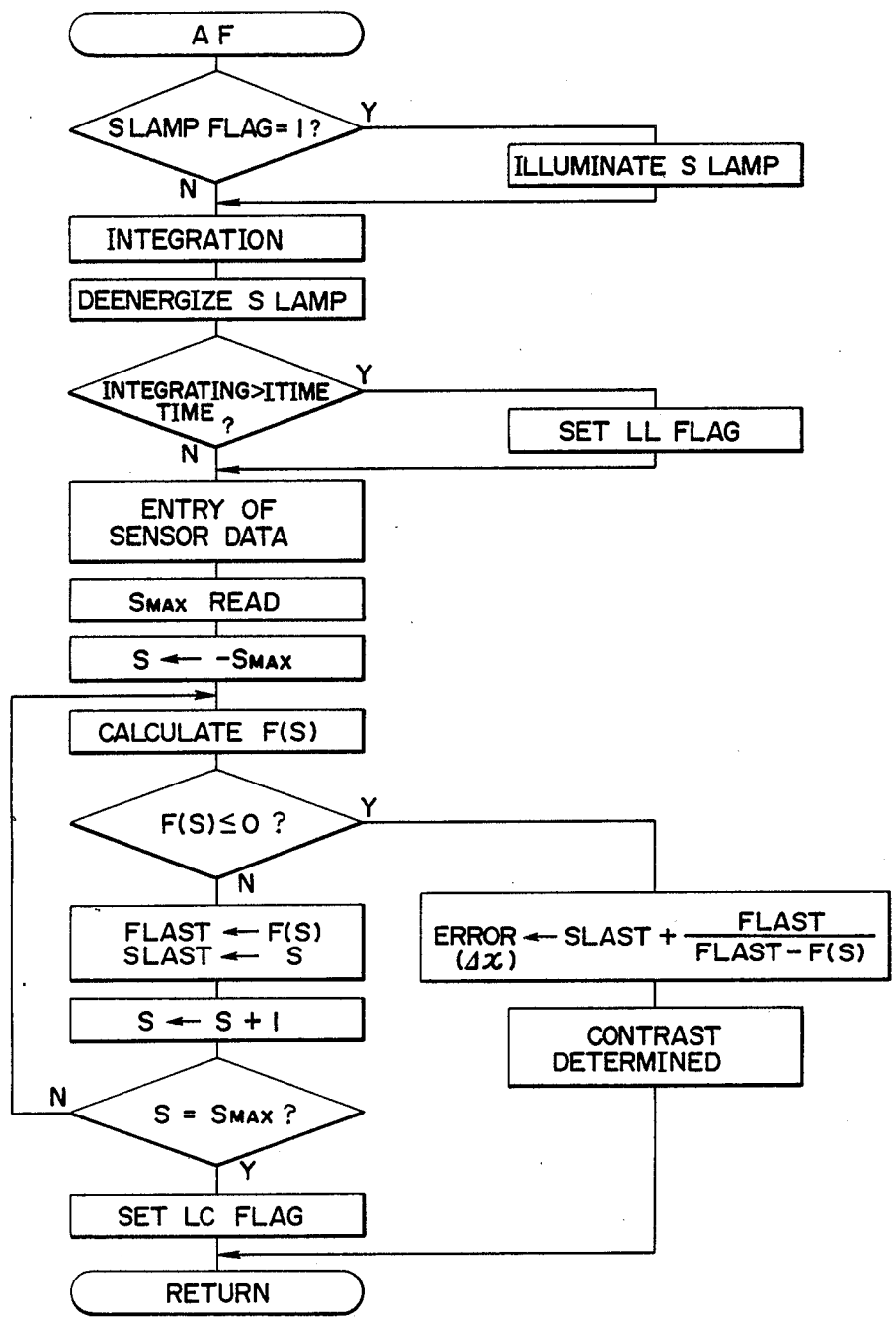

A programmed operation in the "AF" subroutine takes place in a manner shown in FIG. 9. Upon entering the "AF" subroutine, the S-lamp flag is initially examined, and if it is set, the S-lamp is illuminated. The AF CPU 22 then sends an integration start signal to the in-focus sensor 20. In response to the integration start signal, the sensor 20 performs a photoelectric conversion, storing an electric charge in accordance with the contrast of an object being photographed. At this time, an AGC circuit within the A/D converter 21 (see FIG. 5) monitors the charge, and acts to cease the integration when the charge reaches a sufficient level for a dynamic range of the converter 21. During the integrating interval, the AF CPU 22 drives an internal timer to determine an integrating time, which is used to determine the brightness level of an object being photographed. The S-lamp is then deenergized, and the integrating time is compared against ITIME, and if the integrating time is longer, the LL flag is set.

On the other hand, the A/D converter sequentially performs an A/D conversion of the charge from the sensor 20, and transfers the resulting data to the AF CPU 22 where the data is stored in RAM. When the entry of such sensor data is completed, a maximum slit $S_{MAX}$ which is stored in a lens ROM of the lens data circuit 18 is read, and is used to limit the extent of calculation of phase differences. Since the calculation takes place in a sequential manner from the negative side, the sign of $S_{MAX}$ is inverted and stored in register S. An evaluation function F(S) is calculated while incrementing the shift S by one. Each time the calculated value is stored in register $F_{LAST}$. If a phase difference cannot be detected when the value S reaches $S_{MAX}$, the LC flag is set terminating the calculation. When the value of F(S) becomes negative, an interpolated value is calculated using the previous F(S) value or $F_{LAST}$ and the current F(S), and is added to the previous shift $F_{LAST}$. The phase difference calculated in this manner is stored in RAM of AF CPU 22 as ERROR. It is then determined if sensor data used in this calculation is proper by examining a difference between MAX and MIN of such data, and if such difference is small, it is determined that an object being photographed has an insufficient contrast, thus setting the LC flag.

Figure 10:
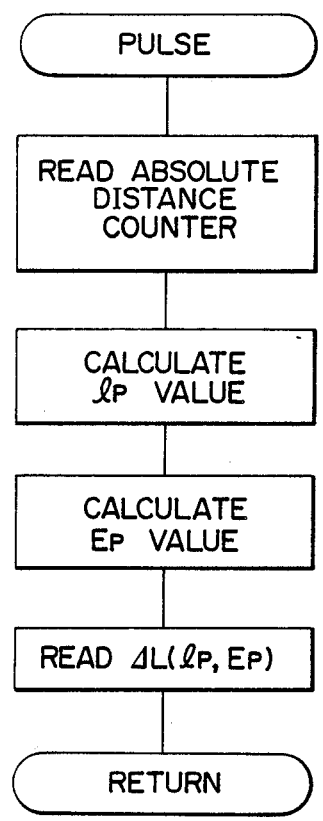

Returning to FIG. 8, if the LL flag and LC flag are both cleared subsequent to the distance measurement of the "AF" routine, "PULSE" routine is called in order to obtain a lens drive value. Referring to FIG. 10, during the "PULSE" routine, the content of the absolute distance counter is read which stores a number of drive pulses from ∞ position of the distance ring associated with the lens. A current position $l_P$ of the focus group is calculated based on this count, and is used to specify a column of drive ΔL matrix contained in lens ROM within the lens data circuit 18. Specifically, the lens ROM stores a table of data representing the drive ΔL as a matrix, as indicated by a Table 2 below, where a particular column of the Table is specified by a selected region $A_1, A_2, \ldots A_{n-1}$, and $A_n$ in which the current position $l_P$ of the focus group is located.

TABLE 2

| focal offset $(E_P)$ | current position of focus group $l_P$ | | | | | |
|---|---|---|---|---|---|---|
| | $A_1$ | $A_2 \ldots$ | $A_{n-3}$ | $A_{n-2}$ | $A_{n-1}$ | $A_n$ |
| $E_P = E_{P1}$ | $\Delta L_{1,1}$ | $\Delta L_{1,2} \ldots$ | $\Delta L_{1,n-3}$ | $\Delta L_{1,n-2}$ | $\Delta L_{1,n-1}$ | $\Delta L_{1,n}$ |
| $E_P = E_{P2}$ | $\Delta L_{2,1}$ | $\Delta L_{2,2} \ldots$ | $\Delta L_{2,n-3}$ | $\Delta L_{2,n-2}$ | $\Delta L_{2,n-1}$ | $\Delta L_{2,n}$ |
| $E_P = E_{P3}$ | $\Delta L_{3,1}$ | $\Delta L_{3,2} \ldots$ | $\Delta L_{3,n-3}$ | $\Delta L_{3,n-2}$ | $\Delta L_{3,n-1}$ | $\Delta L_{3,n}$ |
| $E_P = E_{Pm-1}$ | $\Delta L_{m-1,1}$ | $\Delta L_{m-1,2} \ldots$ | $\Delta L_{m-1,n-3}$ | $\Delta L_{m-1,n-2}$ | $\Delta L_{m-1,n-1}$ | $\Delta L_{m-1,n}$ |
| $E_P = E_{Pm}$ | $\Delta L_{m,1}$ | $\Delta L_{m,2} \ldots$ | $\Delta L_{m,n-3}$ | $\Delta L_{m,n-2}$ | $\Delta L_{m,n-1}$ | $\Delta L_{m,n}$ |

When the focal offset $E_P$ is calculated on the basis of an output (ERROR) obtained by the AF calculation, a particular row of the matrix for the drive ΔL is specified. In this manner, a drive value $\Delta L (l_P, E_P)$ is directly read from the matrix contained in the ROM at an intersection of the current position $l_P$ of the focus group and the offset $E_P$ of the focal plane. Thus, a calculation of the drive value is dispensed with.

In the Table 2, regions $A_1, A_2, \ldots A_{n-1}$ and $A_n$ of the current position $l_P$ of the focus group may be chosen such that the region $A_1$ corresponds to an infinity region, and regions $A_2, A_3, \ldots A_{n-1}$ and $A_n$ may be chosen as regions which sequentially approach the nearest point. Alternatively, the region $A_{n-1}$ may be chosen as the nearest region, and its adjacent region $A_n$ may be chosen as a macro region. As a further alternative, a division into regions $A_1$ to $A_n$ may be dispensed with, permitting an extent from infinity to the nearest point to be processed in a single region, depending on the variety of the taking lens. Where the available memory capacity is small, and only typical values of the focal offset $E_P$ or selected regions A are available, an interpolation may be utilized, which may be enabled when at least two sets of typical values can be used.

Where the offset $E_P$ or the regions A are chosen to enable a linear interpolation, a linear interpolation may be performed by using the following relationship in a Table 3 given below.

$$k_{EP} = (E_P - E_{Pi})/(E_{P(i+1)} - E_{Pi})$$

$$k_A = (A - A_j)/(A_{j+1} - A_j)$$

$$\alpha = \Delta L_{i,j} + k_{EP}(\Delta L_{i+1,j} - \Delta L_{i,j})$$

$$\beta = \Delta L_{i,j+1} + k_{EP}(\Delta L_{i+1,j+1} - \Delta L_{i,j+1})$$

$$\Delta L = \alpha + k_A(\beta - \alpha)$$

TABLE 3

| focal offset $(E_P)$ | current position of focus group $l_P$ | | |
|---|---|---|---|
| | $A_1 \ldots$ | $A_j$ | $A_{j+1} \ldots$ |
| $E_{P1} \leq E_P < E_{P2}$ | | | |
| $E_{P2} \leq E_P < E_{P3}$ | | | |
| . | . | . | . |
| . | . | . | . |
| . | . | . | . |
| $E_{Pi} \leq E_P < E_{Pi+1} \ldots$ | | $\Delta L_{i,j}$ | $\Delta L_{i,j+1} \ldots$ |
| $E_{Pi+1} \leq E_P < E_{Pi+2} \ldots$ | | $\Delta L_{i+1,j}$ | $\Delta L_{i+1,j+1} \ldots$ |
| . | . | . | . |
| . | . | . | . |
| . | . | . | . |

Figure 14:
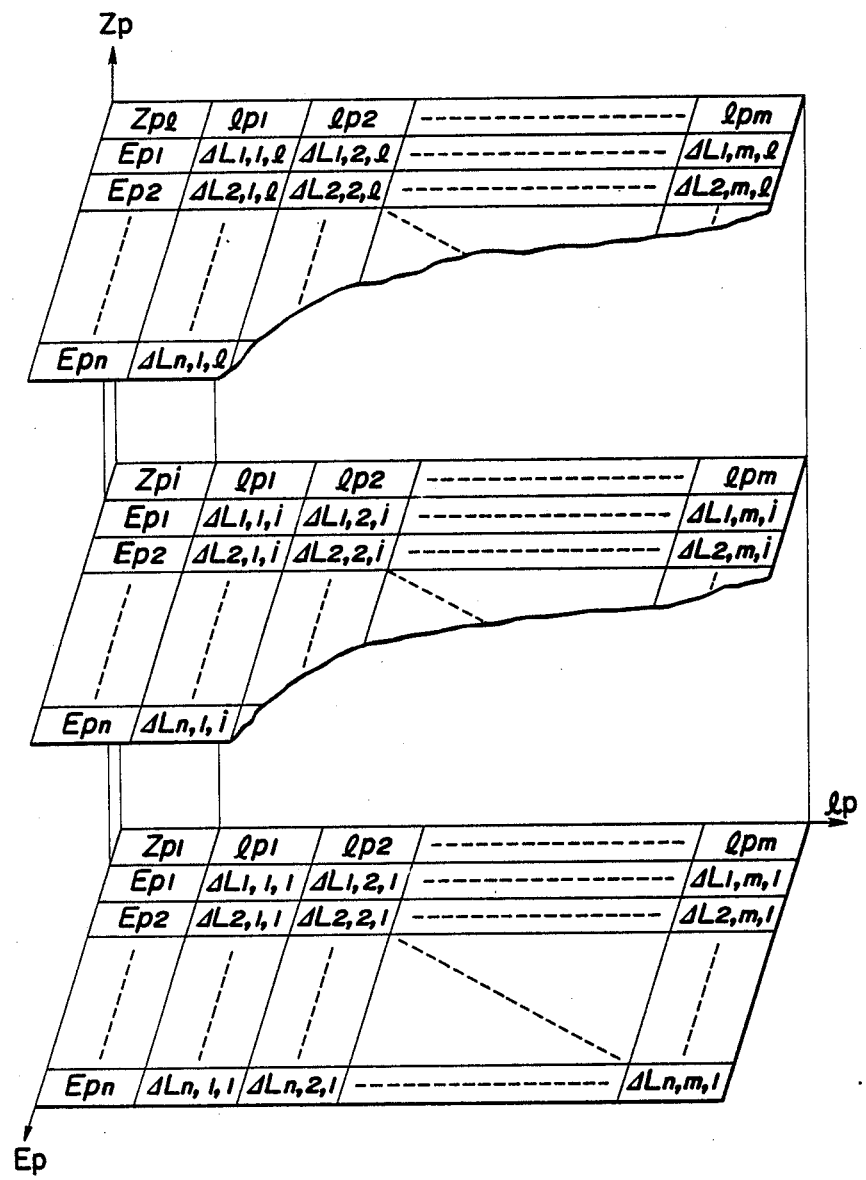
FIG. 14 illustrates Table 4 containing rows and columns of drive values for a focus group when using a zoom lens, in the manner of a perspective view.
Figure 15:
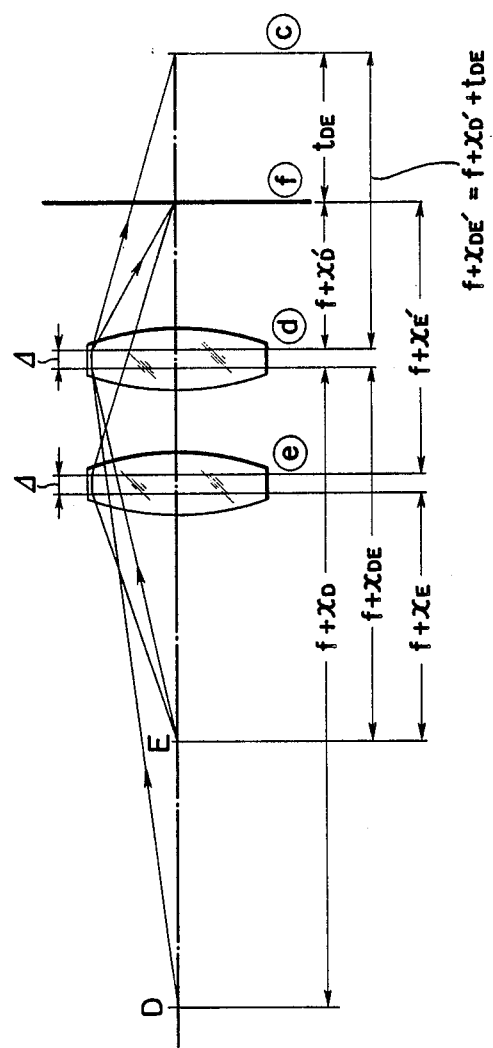
FIG. 15 illustrates an optical path of an auto-focus camera of the prior art which utilizes an entirely fed lens.
Figure 16:
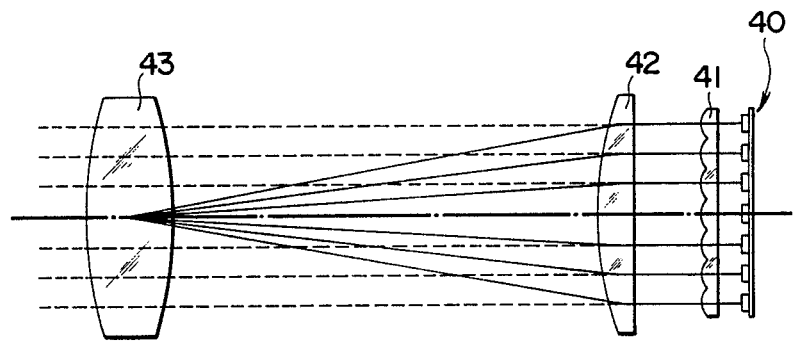
FIG. 16 diagrammatically shows an optical path of incidence of light onto a sensor of a focus detector in a conventional auto-focus camera.
Figure 17A:
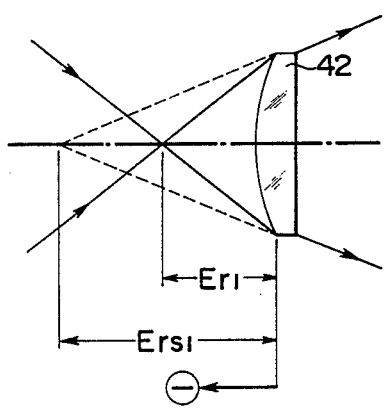
FIGS. 17A and 17B diagrammatically illustrate the incidence of light onto the contact lens shown in FIG. 16 when focussed forwardly and rearwardly.
Figure 17B:
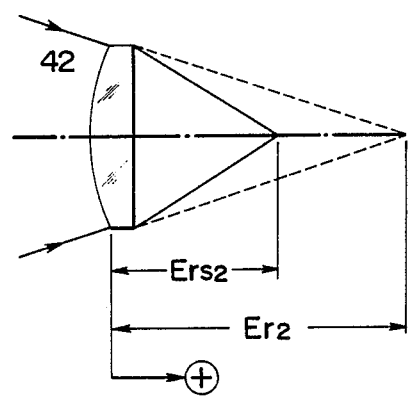
Figure 18:
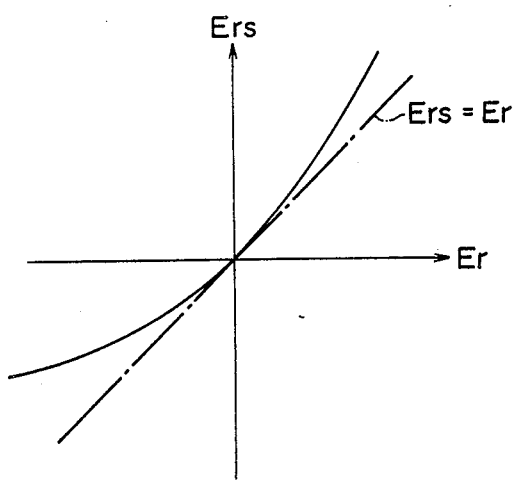
FIG. 18 graphically shows the relationship between the true defocus and the defocus detected by the sensor in the arrangement of FIGS. 17A and 17B.

By choosing the regions $A_1$ to $A_n$ in a manner corresponding to the zooming positions associated with the focal length f of the camera instead of the current position $l_P$ of the focus group, a zooming lens can be accommodated for. In this instance, a three-dimensional matrix as indicated by Table 4 shown in FIG. 14 is utilized. Specifically, a range of focal lengths is divided to provide ranges in each of which a common series of drive values can be used, and a series of drive values $\Delta L (l_P, E_P, Z_P)$ of the focus group is established for each focal length position (zooming position) $Z_P$. In this manner, a drive value ΔL for the focus group can be read from the lens ROM using the position $l_P$ of the focus group, the focal offset $E_P$ and the zooming position $Z_P$. Where the division cannot be made to define a range in which a common drive value is available, the required accuracy can be improved by utilizing an interpolation between adjacent zooming positions.

It is generally recognized that a zooming lens has a reduced maximum magnification in comparison to a single focus lens. Accordingly, a drive value corresponding to an equal focal offset will not be dependent on the position of the focus group. Hence, the three-dimensional matrix may be simplified by removing a portion of the list which indicates the drive values depending on the position $l_P$ of the focus group, as indicated in the Table 5 below where a two-dimensional matrix is defined so as to be specified by the focal offset $E_P$ and the zooming position $Z_P$ to derive a series of drive values ΔL for the focus group.

TABLE 5

| $E_p$ | $Z_{P1}$ | $Z_{P2}$ | $Z_p$ ... | $Z_{Pl-1}$ | $Z_{Pl}$ |
|---|---|---|---|---|---|
| $E_{P1}$ | $\Delta L_{1,1}$ | $\Delta L_{1,2}$ | | $\Delta L_{1,l-1}$ | $\Delta L_{1,l}$ |
| . | . | . | | . | . |
| . | . | . | | . | . |
| . | . | . | | . | . |
| $E_{Pn}$ | $\Delta L_{n,1}$ | $\Delta L_{n,2}$ | ... | $\Delta L_{n,l-1}$ | $\Delta L_{n,l}$ |

In the described embodiment, the matrix which describes the lens drive $\Delta L$ has been described as stored in a lens ROM, but it may be stored within a camera.

It will be seen from the foregoing that the matrix contained within the lens ROM stores a drive value $\Delta L$ which is required to move the focus group of a taking lens to a target position in one AF cycle, thus substantially reducing the length of time which is required for the focussing operation.

Subsequently, as shown in FIG. 8, an output (ERROR) from the AF calculation is compared against an AF accuracy threshold ETh which is read from the lens data circuit 18, and if the output (ERROR) is greater, the program branches to Ⓐ where RETRY flag is examined. During the AF operation of the first cycle, RETRY flag is equal to 0. Accordingly, this flag is set, followed by saving the number of drive pulses. During the AF operation of the second and the subsequent pass, since RETRY flag is set, the current number of drive pulses is compared against the previous number of drive pulses. If the current number of pulses is reduced from the previous number of pulses by an amount corresponding to the lens travel, this means that the lens drive has resulted in bringing it nearer toward the in-focus condition, allowing a prediction that the lens position will be brought closer to the in-focus position. Accordingly, the current number of pulses is saved in place of the previous number of pulses, and "MDRIVAF" routine is called to perform the lens drive.

The purpose of performing a comparison of the current number of pulses against the previous number of pulses is to prevent the divergence of the operation of the entire AF sequence. The comparison may take place by comparing (the current number of pulses) against (the previous number of pulses multiplied by 0.5), or comparing (the current number of pulses) against (the previous number of pulses multiplied by 1.5). Where a divergence of the AF sequence is likely, it is possible that the AF operation be performed during the movement of an object being photographed. In this instance, the lens drive is instantly stopped, and a wasteful AF operation is prevented by setting M flag, whereby the program proceeds to Ⓑ to call for "SDISCNT" and "CALDIS" routines.

After the lens drive has been performed according to "MDRIVAF" routine, the AF loop counter containing a presetting number of distance measurements to be performed is decremented by 1. Unless the resulting count of the counter is not equal to 0, an integrating time is loaded into ITIME register, and when AFENA signal is active (indicating that the release button has been operated to its first step), the program returns to Ⓒ in preparation to the next AF operation. The AF loop counter is decremented by one each time the AF operation extending between Ⓒ — Ⓒ is repeated, causing an in-focus condition being gradually approached. When an output "ERROR" from the AF calculation cannot be reduced less than the AF accuracy threshold ETh when a count in the AF loop counter reaches 0, an in-focus condition cannot be reached, thus setting M flag.

If ERROR < ETh is achieved as a result of the AF operation between Ⓒ — Ⓒ, or when an output (ERROR) from the AF calculation is contained within a focussing error range, the AF status flags are cleared to indicate that an in-focus condition is reached, and the program calls for "SDISCNT" and "CALDIS" routines.

If LL flag or LC flag is set subsequent to "AF" operation, S-lamp flag is examined. If S-lamp flag is previously set to "1", this means that a low light and a low contrast condition prevailed even though the S-lamp 27a has been illuminated during the AF integrating operation. Accordingly, LC flag is examined again, and only for a low contrast condition, "lens NF (focussing disabled)" routine is called for to provide a positive indication that an in-focus condition cannot be reached. Specifically, in "lens NF" routine, the lens is once fed rearward to its nearest point and then fed forward to its ∞ position, thus providing an indication to a user of the incapability of reaching an in-focus condition in a positive manner through an increased stroking of the lens. Alternatively, a movement of the lens from its ∞ position to its nearest position may be employed. During "lens NF" routine, setting the lens at ∞ position is also effective to initialize the absolute distance counter which is used to save a number of pulses from ∞ position of the lens distance ring. If a object being photographed is not of a low contrast, the above failure implies that the AF calculation has been performed under a low light condition, and in this instance the program returns to Ⓓ.

If the S-lamp flag is previously cleared, this means that the S-lamp 27a has been deenergized, and hence if LL flag or LC flag is set, the S-lamp flag is set, and the program proceeds to Ⓔ. Accordingly, during the AF operation of the second or subsequent pass, the S-lamp 27a will be illuminated.

In either instance, at the end of the operation of "AF-SIN2" routine, "SDISCNT" routine is called for and executed, followed by calling for "CALDIS" routine. In "SDISCNT" routine, a number of drive pulses from ∞ position of the distance ring is loaded into the absolute distance counter. In "CALDIS" routine which follows, the number of pulses loaded in this counter and absolute distance coefficients a and b stored in the lens data circuit 18 are used to calculate an absolute distance to an object being photographed. The calculated absolute distance and the count in the counter are fed to the main CPU 14. After the execution of "CALDIS" routine, the program returns to a point in the "AFSIN" routine shown in FIG. 7 which follows the end of "AFSIN" subroutine.

In the described embodiment, the position $l_P$ of the focus group which is required to derive a lens drive value ($l_P$, $E_P$) has been calculated from the content of the absolute distance counter, but may be directly determined by employing a focus encoder which is preset so as to conform to a movement of the focus group rather than relying upon an output from the counter.

Figure 11:
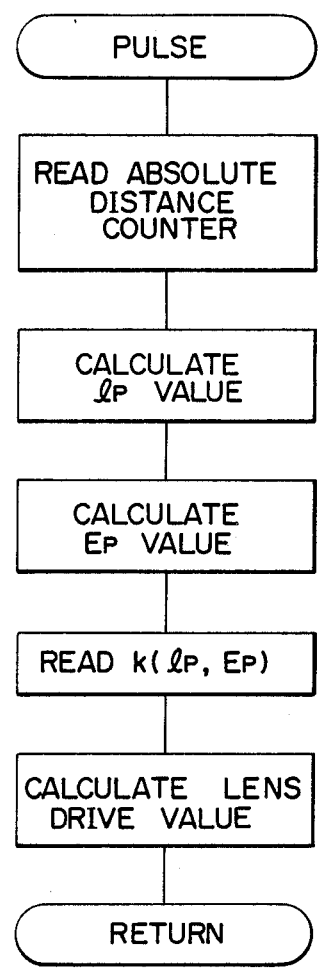
FIG. 11 is a flow chart of a "PULSE" routine where a movement coefficient is used as data specific to a particular taking lens which depends on a focal offset.

In the described embodiment, a series of lens drive values which correspond to focal offsets have been described. However, a similar procedure may be employed to achieve a lens drive by utilizing a series of movement coefficients. In this instance, a movement coefficient k ($l_P$, $E_P$) from a matrix contained in ROM at the intersection of the current lens position $l_P$ and the focal offset $E_P$, and a lens drive value is calculated on the basis of such movement coefficient k, in a manner illustrated in FIG. 11. A calculation is required in this embodiment, but the movement coefficient k has a one-to-one correspondence to the focal offset $E_P$ at the current lens position $l_P$, and hence the drive value can be obtained in one calculation.

Figure 12:
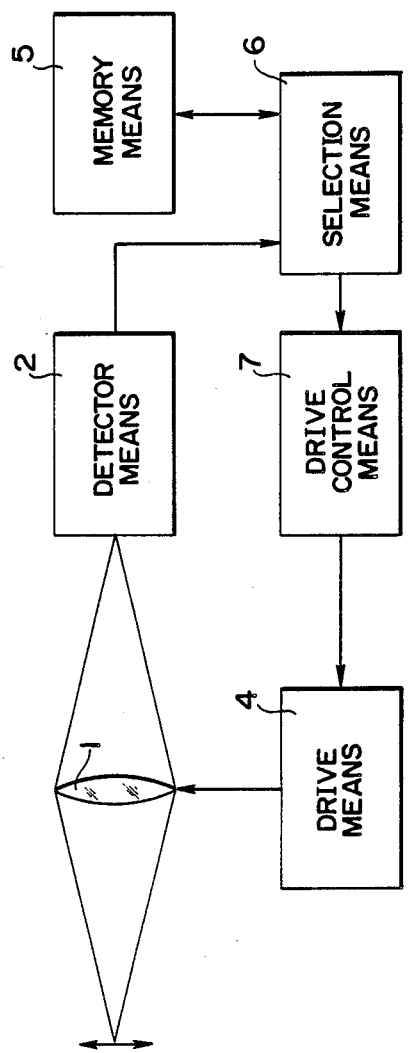
FIG. 12 is a schematic view illustrating the basic concept of the invention as applied in another embodiment of auto-focus camera.

For an embodiment in which a drive value ΔL ($l_P$, $E_P$) is read from the matrix, the basic concept can be illustrated by FIG. 12 instead of FIG. 3. Specifically, calculation means 3 may be replaced by a combination of memory means 5, selection means 6 and drive control means 7. Memory means 5 associated with a lens or the camera is constructed to store a table, as by a matrix, of lens drive values which correspond to values of the focal offset. When a focal offset is outputted from the detection means 2, a lens drive value which corresponds to such focal offset is selected by the selection means 6 from the memory means 5, and the selected lens drive value is subject to an interpolation in the drive control means 5 before it is used in controlling the drive means 4.

As mentioned previously, data which is specific to a particular photographing lens may not be dependent on the magnitude of a focal offset. By utilizing specific data which is not dependent on the focal offset, a lens drive value may be obtained by using a calculation formula represented as by a hyperbolic function. In such instance, coefficients a, b and c appearing in the equation (8) may be incorporated into a data table in a manner corresponding to the position of the focus group (specific data which will be described later is referred to as $\alpha$, $\beta$ and $\gamma$), and a selected coefficient is read from the data table in accordance with the position of the focus group, with a defocus substituted into an approximation equation to derive a travel of the focus group.

Such embodiment which utilizes specific data not dependent on the focal offset will now be described. The specific data which is not dependent on the focal offset is normally fixed to each particular taking lens. However, the taking lens may be a zooming lens, a lens enabling a photographing operation up to a macro range, or one in which a focus group is driven by a non-linear cam or may have an inner or rear focus. If specific data cannot be treated as a fixed value, a required value may be produced in response to a detection signal from means detecting the position of a moving lens (such as means for detecting the position of a focus group or means for detecting the position of a variable magnification system for a zoom lens), or a selection from a series of specific data stored in memory means may be utilized. An interpolation may be utilized as required.

This embodiment may be viewed as calculating a drive value for the focus group in calculation means 3 shown in FIG. 3 on the basis of the focal offset derived by the detecting means 2 and specific data which is not dependent on such focal offset, but is specific to a particular taking lens such as a focus lens or zooming lens.

As mentioned, a relationship between a focal offset and a drive value for a focus group is represented by a hyperbolic function. Representing a focal offset by Er and specific data associated with a particular lens by $\alpha$, $\beta$ and $\gamma$, a drive value L can be approximated by the following equation:

$$\Delta L = \alpha/(\beta + Er) + \gamma/19 \; Er - (\alpha/\beta) \tag{10}$$

Thus, specific data $\alpha$, $\beta$ and $\gamma$ may be chosen in accordance with a particular lens to derive an accurate drive value ΔL.

Where specific data $\alpha$, $\beta$ and $\gamma$ do not cover the entire range of a lens condition, but are only defined for discrete conditions, the accuracy can be improved by providing an interpolation between values of $\alpha$, $\beta$ and $\gamma$. A set of specific data $\alpha$, $\beta$ and $\gamma$ may be stored in a memory which is disposed on either a lens or camera, or may alternatively be produced by means such as a zoom encoder or distance encoder which detects a lens condition.

Figure 13:
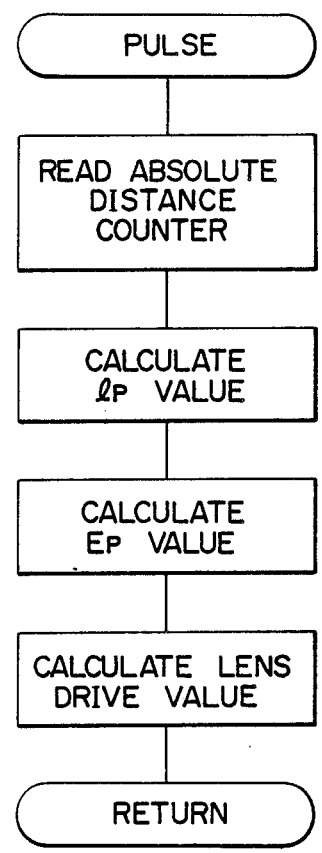
FIG. 13 is a flow chart of a "PULSE" routine when employing data specific to a particular taking lens which does not depend on a focal offset.

A flow chart of "PULSE" routine of this embodiment is shown in FIG. 13. Specifically, the content of an absolute distance counter which stores a number of drive pulses from ∞ position of a lens distance ring is read, and the count is used to calculate the current $l_P$ of the focus group, and is used to read specific data $\alpha$, $\beta$ and $\gamma$ stored in the lens ROM of the lens data circuit 18 which is required for conversion into a drive value. An interpolation between values of specific data $\alpha$, $\beta$ and $\gamma$ may be utilized as required in order to improve the accuracy.

The focal offset $E_P$ which is output from the calculation and the specific data $\alpha$, $\beta$ and $\gamma$ derived in the manner mentioned above are substituted into the equation (10) in which Er is replaced by $E_P$ in order to derive the drive value ΔL.

It is to be noted that the specific data $\alpha$, $\beta$ and $\gamma$ represents a series of data which only depends on the position $l_P$ of the focus group for a single focus lens as illustrated in Table 6 below, but is represented as a two-dimensional series of data which depend on the position $l_P$ of the focus group and a zooming position $Z_P$ (focal length) as shown in Table 7 below.

TABLE 6

|   | $l_{P1}$ | $l_{P2}$ ... | $l_{Pi}$ ... | $l_{Pn-1}$ | $l_{Pn}$ |
|---|---|---|---|---|---|
| $\alpha$ | $\alpha_1$ | $\alpha_2$ ... | $\alpha_i$ ... | $\alpha_{n-1}$ | $\alpha_n$ |
| $\beta$ | $\beta_1$ | $\beta_2$ ... | $\beta_i$ ... | $\beta_{n-1}$ | $\beta_n$ |
| $\gamma$ | $\gamma_1$ | $\gamma_2$ ... | $\gamma_i$ ... | $\gamma_{n-1}$ | $\gamma_n$ |

TABLE 7

| $Z_P$ | $l_P$ | $l_{P1}$ | $l_{P2}$ | ... | $l_{Pi}$ | ... | $l_{Pn}$ |
|---|---|---|---|---|---|---|---|
| $Z_{P1}$ | $\alpha$ | $\alpha_{1,1}$ | $\alpha_{1,2}$ |  | $\alpha_{1,i}$ |  | $\alpha_{1,n}$ |
|  | $\beta$ | $\beta_{1,1}$ | $\beta_{1,2}$ |  | $\beta_{1,i}$ |  | $\beta_{1,n}$ |
|  | $\gamma$ | $\gamma_{1,1}$ | $\gamma_{1,2}$ |  | $\gamma_{1,i}$ |  | $\gamma_{1,n}$ |
| $Z_{Pj}$ | $\alpha$ | $\alpha_{j,1}$ | $\alpha_{j,2}$ |  | $\alpha_{j,i}$ |  | $\alpha_{j,n}$ |
|  | $\beta$ | $\beta_{j,1}$ | $\beta_{j,2}$ |  | $\beta_{j,i}$ |  | $\beta_{j,n}$ |
|  | $\gamma$ | $\gamma_{j,1}$ | $\gamma_{j,2}$ |  | $\gamma_{j,i}$ |  | $\gamma_{j,n}$ |
| $Z_{Pm}$ | $\alpha$ | $\alpha_{m,1}$ | $\alpha_{m,2}$ |  | $\alpha_{m,i}$ |  | $\alpha_{m,n}$ |

TABLE 7-continued

| $Z_P$ | $l_P$ | $l_{P1}$ | $l_{P2}$ | ... | $l_{Pi}$ | ... | $l_{Pn}$ |
|---|---|---|---|---|---|---|---|
| | $\beta$ | $\beta_{m,1}$ | $\beta_{m,2}$ | | $\beta_{m,i}$ | | $\beta_{m,n}$ |
| | $\gamma$ | $\gamma_{m,1}$ | $\gamma_{m,2}$ | | $\gamma_{m,i}$ | | $\gamma_{m,n}$ |

It will be evident from Table 7 that for a zoom lens, the relationship between the focal offset and the drive value changes with the zooming condition (zooming position $Z_P$). In addition, a maximum magnification of a zoom lens is frequently less than that of a single focus lens, and in this instance, the data $\alpha$, $\beta$ and $\gamma$ may be treated as one-dimensional series of data which depends on the zooming position $Z_P$ alone. The zooming position $Z_P$ which is used in this instance may be derived as a signal from a zoom encoder which is mounted in the zoom system of the taking lens.

The drive value $\Delta L$ to move the focus group of the lens to a target position in one AF cycle is also calculated in this embodiment. A correction calculating segment may be transferred into the main CPU 14, thus reducing the capability of calculation required of the sensor. A high speed and a high accuracy calculation can be achieved by employing a high performance main CPU 14 which has the capability of performing a high level of arithmatic operations.

While embodiments have been described above for a camera having an interchangeable lens, it should be understood that the invention is not limited thereto, but is equally applicable to a camera having no interchangeable lens, but which utilizes either TTL or active distance measurement in which either projected or reflected light passes through the taking lens.

What is claimed is:

1. An auto-focus camera comprising
   detection means for detecting a focal offset between a position of an imaging plane on an optical axis where light from an object being photographed is image through a taking lens and a position of a film surface on the optical axis;
   table means for providing drive values specific to a particular taking lens, said drive values each being associated with a given offset value and a lens position value;
   offset determining means employing the detected focal offset for reference to data which is specific to a particular taking lens and for determining a focus lens drive value in accordance with such data and the focal offset in a single step;
   and drive means for moving the focus lens in accordance with the drive value.

2. An auto-focus camera according to claim 1 in which said table means comprises electrical memory means for storing said data.

3. An auto-focus camera according to claim 1 in which the table means includes memory means which store the specific data, and said selecting means includes conversion means for converting the focal offset derived by the detecting means into a signal relating to the focus lens drive value on the basis of the specific data.

4. An auto-focus camera according to claim 3 in which the conversion means operates to perform a calculation according to a hyperbolic function.

5. An auto-focus camera according to claim 3 in which the conversion means uses a matrix for conversion.

6. An auto-focus camera comprising
   detecting means for detecting a focal offset between a position of an imaging plane on an optical axis where light from an object being photographed is imaged through a taking lens and a position of a film surface on the optical axis;
   memory means for storing a table for the focus lens drive values which correspond to values of the focal offset;
   selection means for selecting a focus lens drive value which corresponds to a particular value of the focal offset which is developed by the detecting means;
   and drive control means responsive to the focus lens drive value which is selected by the selection means to control a focus lens drive means.

7. An auto focus camera according to claim 6 in which a plurality of sets of focus lens drive values are stored in a table form in the memory means so as to be dependent on the position, of the focus group.

8. An auto-focus camera according to claim 6 in which the drive control means calculates a focus lens drive value through an interpolation.

9. An auto-focus camera according to claim 7 in which at least two of the plurality of sets stored in a table form is used to calculate the focus lens drive value.

10. An auto-focus camera according to claim 6 in which a plurality of sets of focus lens drive values are stored in the table form in the memory means so as to be dependent on the position of a variable magnification lens.

11. An auto-focus camera according to claim 6 in which the drive control means calculates a focus lens drive value for a variable magnification lens through an interpolation of values from said table.

12. An auto-focus camera according to claim 10 in which at least two of the plurality of sets stored in the table form is used to calculate the focus lens drive value.

13. An auto-focus camera comprising:
    detecting means for detecting a focal between a position of an imaging plane on an optical axis where light from an object being photographed is imaged through a taking lens and a position of a film surface on the optical axis;
    and calculation means for calculating a focus lens drive value for which the non-linearity of a focal offset is corrected for on the basis of the focal offset as well data which are specific to a plurality of lenses and not dependent on the magnitude of the focal offset which are used to convert a focal offset into a corresponding focus lens drive value.

14. An auto-focus camera according to claim 13 in which the specific data is stored in memory means which is associated with the taking lens or the camera.

15. An auto-focus camera according to claim 13 in which a plurality of sets of specific data are provided in accordance with the position of the focus group.

16. An auto-focus camera according to claim 13 in which a plurality of specific data are provided in accordance with the position of a variable magnification lens.

17. An auto-focus camera according to claim 16 in which at least two of the plurality of sets of specific data are used to calculate a focus lens drive value.

18. An auto-focus camera according to claim 15 in which at least two of the plurality of sets of specific data are used to calculate a focus lens drive value.

19. An auto-focus camera according to claim 13 in which the calculation means derives a drive value $\Delta L$ in accordance with the following equation:

$$\Delta L = \alpha/(\beta + Er) + \gamma \cdot Er - (\alpha/\beta)$$

where $\alpha$, $\beta$ and $\gamma$ represent a specific data of a particular taking lens and Er represents a focal offset.

20. An auto-focus camera comprising:
first detecting means for detecting a focal offset associated with the focussing operation by a taking lens;
second detecting means for detecting the position of the taking lens;
memory means for storing a drive value for the taking lens in a matrix form so as to correspond to a focal offset and a position of the taking lens;
and drive means for driving the taking lens in accordance with a drive value which is read from the memory means.

21. An auto-focus camera comprising:
first detecting means for detecting a focal offset which is caused by an imaging operation of a taking lens;
second detecting means for detecting the position of the taking lens;
memory means for storing movement coefficients in the form of a matrix so as to correspond to the focal offset and the position of the taking lens;
calculation means for calculating a drive value for the taking lens on the basis of a movement coefficient which is read from the memory means;
and drive means for driving the taking lens in accordance with the drive value.

22. An auto-focus camera comprising:
a sensor for receiving a light beam from an object being photographed which has passed through a taking lens;
detecting means responsive to an output from the sensor to detect a focal offset of the taking lens;
memory means for storing data which is specific to the taking lens;
calculation means for calculating a drive value utilizing the specific data and an approximation formula of hyperbolic form;
and drive means for driving the taking lens in accordance with the drive value.

23. An auto-focus camera according to claim 22 in which the hyperbolic approximation formula is given in the following form:

$$\Delta L = \alpha/(\beta + Ers) + \gamma \cdot Ers - (\alpha/\beta)$$ wherein $\Delta L$ represents a drive value, Ers a focal offset and $\alpha$, $\beta$ and $\gamma$ data which are specific to the taking lens in use.

24. An auto-focus camera comprising:
a sensor for receiving a light beam from an object being photographed which has passed through a taking lens;
detecting means responsive to an output from the sensor to detect a focal offset of the taking lens;
memory means for storing data which is specific to the taking lens;
first calculation means for calculating a movement coefficient utilizing the specific data and an approximation formula of hyperbolic form;
second calculation means for calculating a drive value for the taking lens on the basis of the movement coefficient and the focal offset;
and drive means for driving the taking lens in accordance with the drive value.

25. An auto-focus camera according to claim 24 in which the hyperbolic approximation formula is given in the following form:

$$k = \alpha'/(\beta' + Ers) + \gamma'$$

where k represents the movement coefficient, Ers a focal offset, and $\alpha'$, $\beta'$ and $\gamma'$ data which are specific to the taking lens.

26. A method of automatically controlling the focus of a camera comprising the steps of:
detecting a focal offset caused by an imaging operation by a taking lens and the position of a taking lens as an in-focus or out-of-focus condition thereof is being detected;
retrieving a drive value from a table of drive values in terms of the focal offset and a position of the taking lens associated with the drive values; and
driving the taking lens in accordance with a result of such retrieval.

27. A method of automatically controlling the focus of a camera comprising the steps of:
detecting a focal offset caused by an imaging operation by a taking lens and a position of a taking lens as an in-focus or out-of-focus condition thereof is being detected;
retrieving a movement coefficient from a table of coefficients in terms of a focal offset and the position of said taking lens associated with said coefficients; and
calculating a drive value for the taking lens on the basis of a result of such retrieval.

28. A method of automatically controlling a camera comprising the steps of:
receiving by a sensor a light beam from an object being photographed which has passed through a taking lens;
receiving an output from the sensor to detect a focal offset of the taking lens which is used to retrieve specific data from memory means which store data specific to the taking lens;
calculating a drive value utilizing the specific data and an approximation formula of hyperbolic form;
and driving the taking lens in accordance with the drive value.

29. A method of automatically controlling the focus of a camera comprising the steps of:
receiving by a sensor a light beam from an object being photographed which has passed through a taking lens;
receiving an output from the sensor to detect a focal offset of the taking lens which is used to retrieve the specific data from memory means which store data specific to the taking lens;
initially calculating a movement coefficient utilizing the specific data and hyperbolic approximation formula;
then calculating a drive value for the taking lens on the basis of the movement coefficient and the focal offset;
and driving the taking lens in accordance with the drive value.

* * * * *

UNITED STATES PATENT AND TRADEMARK OFFICE
CERTIFICATE OF CORRECTION

PATENT NO. : 4,931,820

DATED : June 5, 1990

INVENTOR(S) : Matsuzawa et al.

It is certified that error appears in the above-identified patent and that said Letters Patent is hereby corrected as shown below:

Column 1, line 7, "as" should be --a--

Column 1, line 49, in the equation after "$f^2$" delete "ps"

Column 6, line 13, "Ax" should be --$\Delta x$--

Column 12, line 21, "date" should be --data--

Column 17, line 25, "AL" should be --$\Delta L$--

Column 18, line 17, the equation should read as follows:
-- $\Delta L = \alpha/(\beta + Er) + \gamma \cdot Er - (\alpha/\beta)$      (10) --

Column 19, line 40, "image" should be --imaged--

Column 20, line 39, after "focal" insert --offset--

Column 22, line 33, after "controlling" insert
--the focus of--

Signed and Sealed this

First Day of October, 1991

Attest:

HARRY F. MANBECK, JR.

*Attesting Officer*     Commissioner of Patents and Trademarks